United States Patent
Martinez Gonzalez et al.

(10) Patent No.: US 12,280,546 B2
(45) Date of Patent: Apr. 22, 2025

(54) TREATMENT OF ARTICLES

(71) Applicant: HEWLETT-PACKARD DEVELOPMENT COMPANY, L.P., Spring, TX (US)

(72) Inventors: Daniel Martinez Gonzalez, Sant Cugat del Valles (ES); Alejandro Torres Pinero, Sant Cugat del Valles (ES); Xavier Gasso Puchal, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 1030 days.

(21) Appl. No.: 17/272,892

(22) PCT Filed: Apr. 22, 2019

(86) PCT No.: PCT/US2019/028479
§ 371 (c)(1),
(2) Date: Mar. 2, 2021

(87) PCT Pub. No.: WO2020/219006
PCT Pub. Date: Oct. 29, 2020

(65) Prior Publication Data
US 2021/0187852 A1    Jun. 24, 2021

(51) Int. Cl.
*B29C 64/30*     (2017.01)
*B29C 64/386*    (2017.01)
*B33Y 40/20*     (2020.01)
*B33Y 50/00*     (2015.01)

(52) U.S. Cl.
CPC ............ *B29C 64/30* (2017.08); *B29C 64/386* (2017.08); *B33Y 40/20* (2020.01); *B33Y 50/00* (2014.12)

(58) Field of Classification Search
CPC ..... B29C 64/30; B29C 64/386; B29C 64/188; B29C 71/0009; B33Y 50/00; B33Y 40/20
See application file for complete search history.

(56) References Cited

U.S. PATENT DOCUMENTS

| | | |
|---|---|---|
| 3,684,553 A | 8/1972 | Van Dyk |
| 4,581,100 A | 4/1986 | Hatzakis |

(Continued)

FOREIGN PATENT DOCUMENTS

| | | |
|---|---|---|
| CN | 108790175 | 11/2018 |
| EP | 1684966 A1 | 8/2006 |

(Continued)

OTHER PUBLICATIONS

Gelperin; "Basic Processes and Apparatuses of Chemical Technology"; 1981; pp. 177-183 (in Russian); English Abstract provided.

*Primary Examiner* — Brian W Jennison
(74) *Attorney, Agent, or Firm* — Michael Dryja

(57) ABSTRACT

Apparatus is described comprising a hermetically sealable treatment chamber, a pump and a disperser. The treatment chamber comprises an interior into which an article to be treated can be disposed. The pump is in fluidic communication with the interior of the treatment chamber to form a closed loop about which a dispersed treatment agent can circulate. The disperser is disposed within the closed loop and is arranged to disperse a treatment agent into the interior of the treatment chamber.

12 Claims, 6 Drawing Sheets

(56) References Cited

U.S. PATENT DOCUMENTS

| | | | |
|---|---|---|---|
| 2010/0043844 A1* | 2/2010 | Han | A47L 15/4234 |
| | | | 134/102.1 |
| 2013/0235121 A1 | 9/2013 | Gras | |
| 2016/0108522 A1* | 4/2016 | Donovan | B33Y 40/20 |
| | | | 118/712 |
| 2017/0210063 A1 | 7/2017 | Andres | |
| 2018/0038037 A1 | 2/2018 | Hui | |
| 2018/0178241 A1* | 6/2018 | Luo | B29C 64/188 |
| 2018/0194086 A1* | 7/2018 | Alves | C08J 7/02 |
| 2020/0215757 A1* | 7/2020 | Arienti | B29C 64/35 |
| 2021/0197285 A1* | 7/2021 | Schodin | B33Y 30/00 |

FOREIGN PATENT DOCUMENTS

| | | |
|---|---|---|
| JP | 2011235558 | 11/2011 |
| RU | 2625848 C1 | 7/2017 |
| WO | WO2018071428 | 4/2018 |
| WO | WO-2018127683 | 7/2018 |
| WO | WO-2018194567 A1 | 10/2018 |
| WO | WO-2018235121 A1 | 12/2018 |

* cited by examiner

TREATMENT OF ARTICLES

BACKGROUND

Articles, such as 3D printed plastic parts, may be treated to alter their outer surface. The articles may be treated by placing them into a treatment chamber and exposing them to a treatment agent. To ensure that the article is treated completely, the treatment agent may be dispersed within the interior of the treatment chamber to ensure an even coverage of the treatment agent on the article being treated.

DETAILED DESCRIPTION

Figure 1:
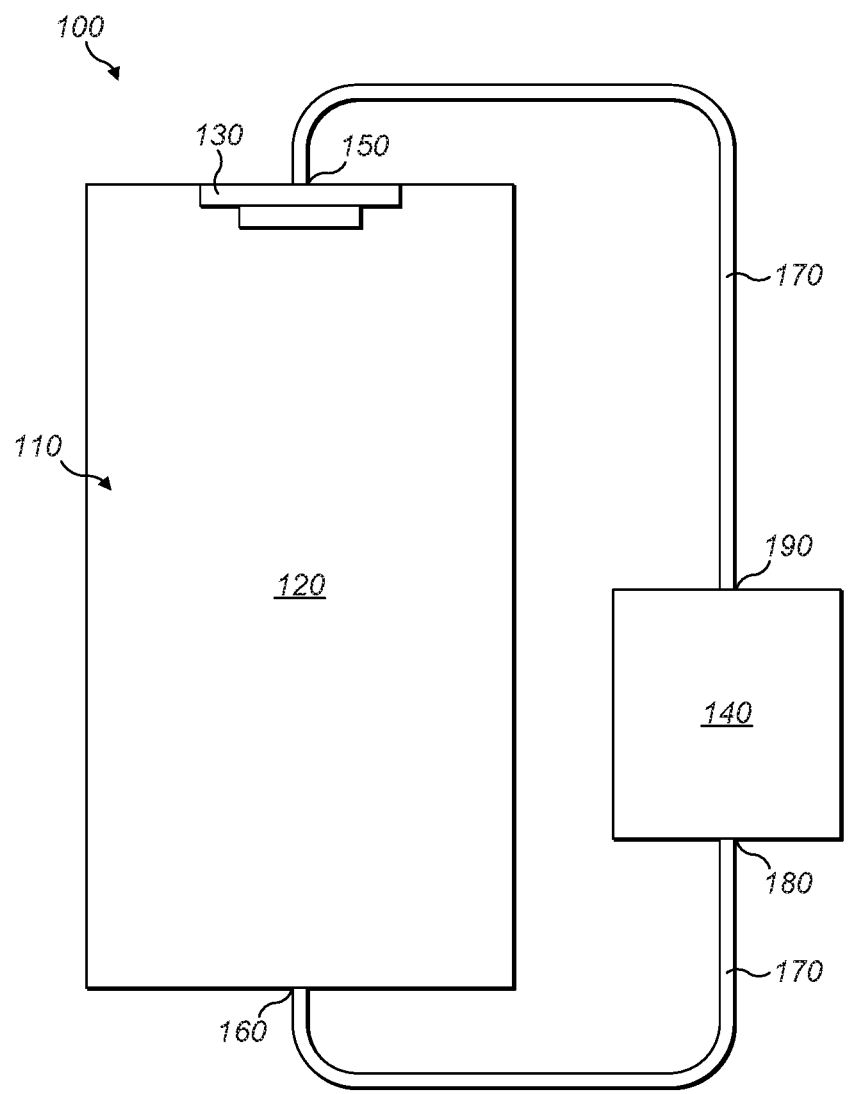
FIG. 1 is a schematic representation of an example of treatment apparatus.

A number of examples will be discussed in detail below. Where like parts in different Figures are discussed, the same reference numeral will be used.

Different articles may be treated using a range of different treatment agents. An example of an article that may be treated includes 3D-printed plastic parts. These can be post-processed after printing by exposure to a vaporised solvent, where contact of the vaporised solvent polishes and/or smooths a surface of the 3D-printed plastic part. In an example, metals may be post-processed in the presence of a gas that reacts with the surface of the metal. The metal articles to be treated may be produced by 3D printing methods. Other examples of articles to be treated include ceramics and resins. Ceramic and resin articles to be treated may be produced by 3D printing methods. The choice of treatment agent will depend on the nature of the article being treated. Numerous other examples of articles that can be treated with a treatment agent exist, which may fall within the scope of the present disclosure.

As shown in FIG. 1, treatment of an article to be treated by a treatment agent may be conducted within an hermetically sealable treatment apparatus, generally indicated 100. The treatment apparatus includes a treatment chamber, generally indicated 110, having an interior 120, a disperser 130, and a pump 140 in fluidic communication with the treatment chamber 110. The pump 140 is connected to an inlet 150 and outlet 160 of the treatment chamber 110 with tubing 170, so the interior 120 of the treatment chamber 110 and the pump 140 form a closed loop about which a treatment agent, when added, can circulate. The disperser 130 is connected to the inlet 150. An article to be treated may be disposed within the interior 120 of the treatment chamber 110, where in use it may be exposed to a treatment agent.

The treatment chamber 110 can be of any size or shape, depending on the size or quantity of articles to be treated. The treatment chamber 110 may be made of a material such as plastic, metal or glass, or a combination thereof. The treatment chamber 110 may be subject to strong negative pressure, and exposed to highly reactive treatment agents, so the design of the treatment chamber 110 will need to take these conditions into account. The design of the treatment chamber 110, such as the size and shape, may also take into account fluid dynamics, as a treatment agent may be circulated around the interior 120 of the treatment chamber 110 in order to evenly cover the outer surface of the article to be treated.

The tubing may have a fluid-proof seal with the treatment chamber 110 and/or the pump 140, and may be made of a material suited to the treatment agent used. Some solvents and gases which may be used as treatment agents can be highly reactive and/or flammable and/or poisonous, so in order to maintain a hermetic seal within the treatment chamber 110, suitable unreactive, fluid-proof and strong materials may be chosen.

The pump 140 may be a vacuum pump such as a positive displacement pump, an example of which includes a peristaltic pump. The pump 140 may comprise an inlet and an outlet to connect to the tubing 170, which is connected to the treatment chamber 110.

Figure 2:
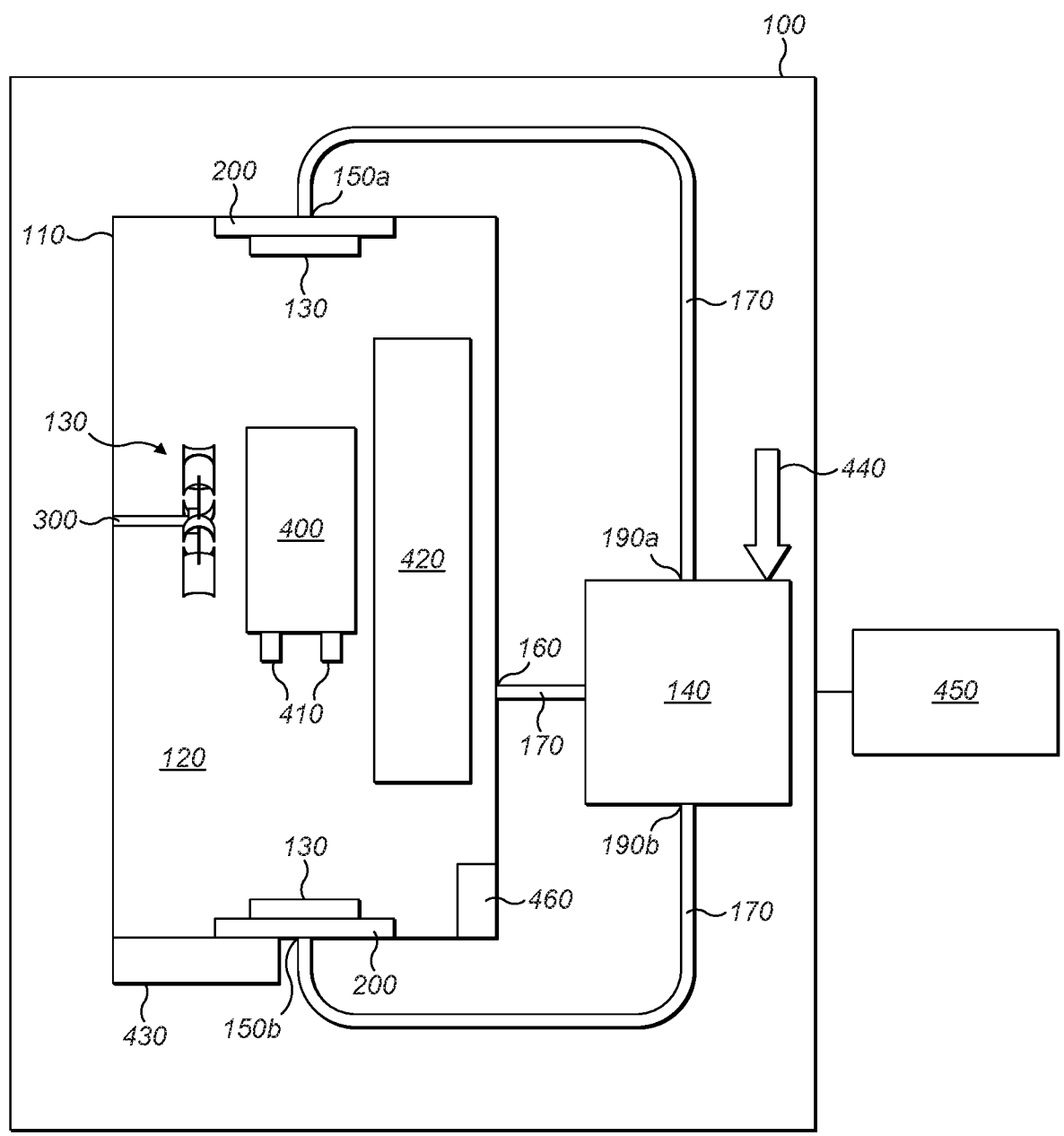
FIG. 2 is a schematic representation of another example of treatment apparatus.

In the example shown in FIG. 2, the hermetically sealable treatment chamber 110 is provided with two inlets 150*a*, 150*b* and one outlet 160, all connected to the pump 140 via tubing 170, effectively forming two closed loops. A treatment chamber 110 may have any number of inlets and outlets, connected to one or more pump 140, and the number and arrangement of inlets and outlets may be optimised depending on the size and shape of the treatment chamber 110 and also of the article to be treated.

Figure 3:
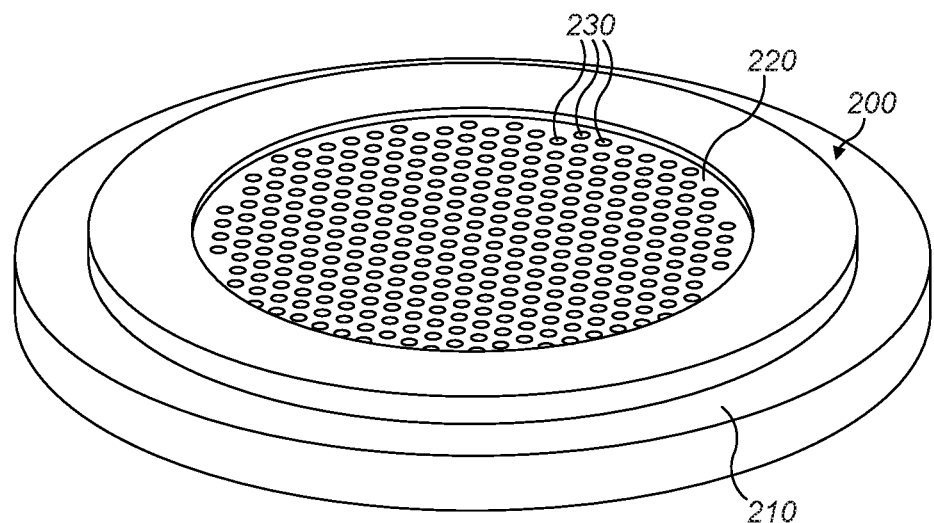
FIG. 3 is a perspective view of an example of a diffusion plate.

One or more disperser 130 is disposed within the treatment chamber 110. In another example, not shown in FIG. 2, a disperser 130 may be provided in a tube 170 leading into the interior 120 of the treatment chamber 110. The term disperser can encompass any apparatus that can disperse a fluid. The dispersers 130 are arranged to disperse treatment agent within the treatment chamber 110 to ensure even coverage of the treatment agent on the article to be treated. As shown schematically in FIGS. 1, 2 and 3, an example of a disperser is a gas diffusion plate 200. The gas diffusion plate 200 as depicted in FIG. 3 has a generally cylindrical hollow body 210, and a generally round surface plate 220 containing a series of evenly spaced apertures 230 extending through the surface plate 220. As shown in FIGS. 1 and 2, the gas diffuser plate 200 is disposed inside and is connected to an inner wall of the treatment chamber 110, and encloses the inlet(s) 150*a*, 150*b*. The evenly spaced apertures 230 are arranged such that any fluid entering the treatment chamber 110 through the inlets 150*a*, 150*b* will be dispersed evenly throughout the interior 120 of the treatment chamber 110. The size and shape of the gas diffuser plate 200, and the apertures 230, can be designed based on the desired fluid dynamics, and could include flaps or nozzles to direct fluid flow.

Figure 4:
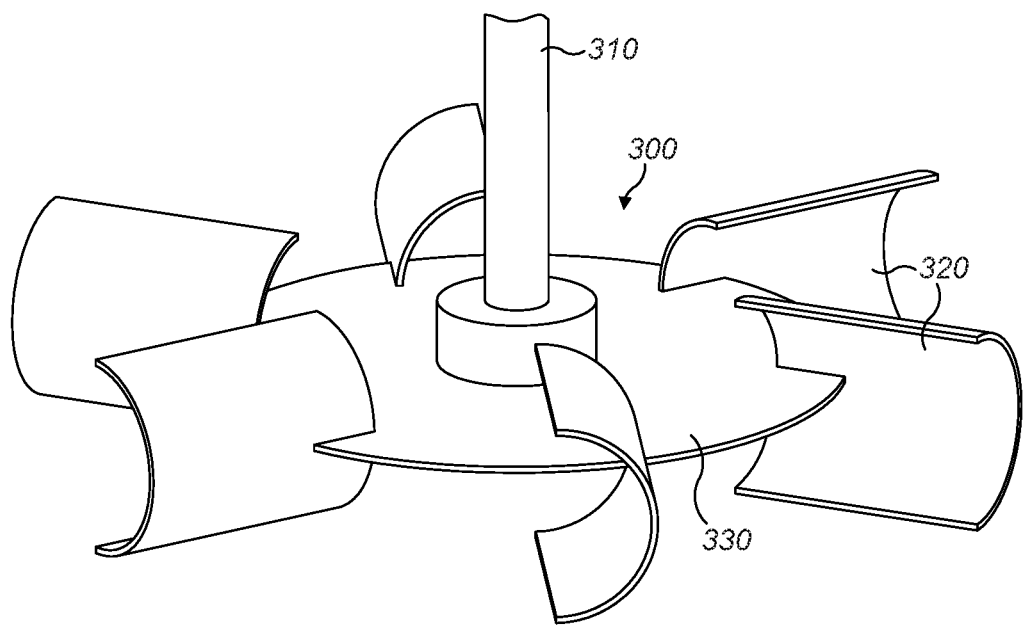
FIG. 4 is a perspective view of an example of an impeller.

Another example of a disperser, as shown for example in FIGS. 2 and 4, is a fan blade impeller 300. The impeller 300 is rotatably mounted to a shaft 310. The impeller 300 comprises a plurality of fan blades 320 mounted on a wheel 330. The impeller may be rotatable upon contact with a fluid, such as treatment agent within the interior 120 of the treatment chamber 110, and rotation of the impeller 300 may cause even dispersal of the treatment agent. Other designs of impeller, such as those with a variety of number and size of blades 320 may be used to optimise fluid dispersal. Further-more, the number and position of impellers 300 within the treatment chamber 110 may be selected to optimise fluid dispersal.

The treatment apparatus 100 may include gas diffusion plates 200 or impellers 300, or a combination of the two. Other examples of disperser 130 that can be disposed within the treatment chamber 110 to disrupt fluid flow and disperse a treatment agent evenly about the treatment chamber 110 may be used in addition to or as an alternative to gas diffusion plates 200 and/or impellers 300.

As shown in FIG. 2, an article to be treated, in this example a 3D-printed plastic part 400, may be located in the interior 120 of the treatment chamber 110. The plastic part 400 may be seated on a rack or stand 410, or may be suspended from the roof of the treatment chamber 110 or otherwise supported to ensure that as much surface area of the article as possible is exposed to the treatment agent.

The wall of the treatment chamber 110 may be provided with a sealable door 420, though in some examples it may be provided with a sealable lid or other sealable orifice through which an article to be treated may be disposed into, and subsequently removed from, the treatment chamber 110.

The treatment apparatus may include a heater 430. An example is shown in FIG. 2, in which the heater 430 is disposed beneath the treatment chamber 110. One or a plurality of heaters 430, of any type, may be placed at any point around the treatment apparatus 100 in order to heat the treatment agent. The heater could take any known form, such as electrically heated coils, a water bath, recirculated hot air and the like. The walls of the treatment chamber 110 may also be heated so that, as used in some examples, vaporised treatment agent does not condense on the walls of the treatment chamber 110.

The pump 140 may be arranged to circulate the treatment agent within the treatment chamber 110, and also to create a vacuum within the treatment chamber 110. Although not shown, the pump 140 may be configured, for example by a system of valves, to expel fluid from within the treatment chamber 110. This role may alternatively be carried out by a second pump 140 in fluidic communication with the treatment chamber 110. The pump 140 may expel any fluid, such as air, that is initially present in the treatment apparatus to create a vacuum prior to the insertion of a treatment agent, and may, in addition to or alternatively, be used to flush treatment agent out of the system after the article to be treated 400 has been treated.

The treatment apparatus 100 may further include a fluid inlet so that treatment agent may be inserted into the system. As shown in FIG. 2, a sealable inlet represented by arrow 440 is disposed in the pump 140, and treatment agent may be injected into the inlet 400 or drawn from a treatment agent source. In an example, a series of pipes and valves may connect a source of treatment agent to the apparatus 100, permitting treatment agent to be added to the closed loop.

As shown in FIG. 2, the apparatus may also include a processor 450 to control the operation of the apparatus 100. The processor 450 could be a personal computer (PC), programmable logic controller (PLC) or the like, and could be integral with the apparatus 100, or remote from the apparatus 100 and in cabled or wireless communication with the apparatus. A sensor 460 may also be provided in the apparatus, for example within or adjacent the treatment chamber 110 to detect a condition within the treatment chamber. Conditions can, for example, include the temperature and/or pressure within the treatment chamber 110.

Figure 5:
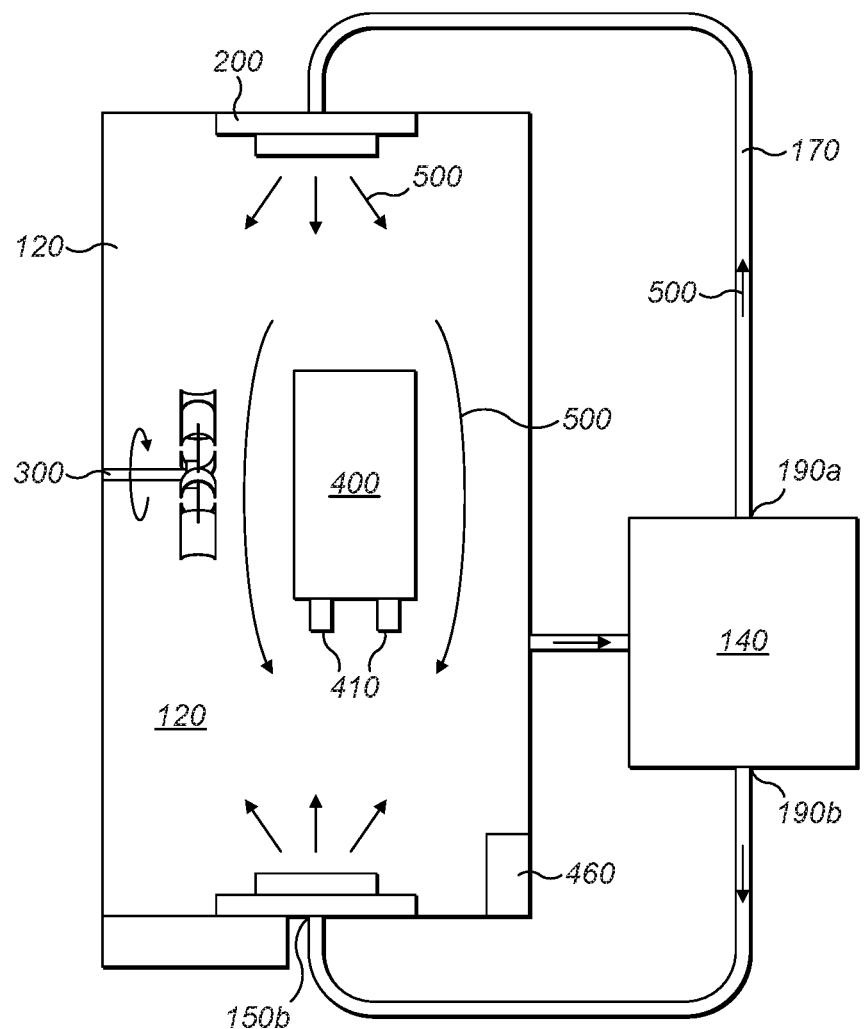
FIG. 5 is a schematic representation of the apparatus of FIG. 2 in use.

As shown in FIG. 5, in an example of use of the apparatus as shown in FIG. 2, a user may place the article to be treated, for example a 3D-printed plastic part 400, into the interior 120 of the treatment chamber 110. To do so, the user may open the door 420 (shown in FIG. 2 but not in FIG. 5) of the treatment chamber 110 and place the part 400 onto the rack 410, and then close the door 420. Closing the door 420 hermetically seals the treatment chamber 110, pump 140 and tubing 170 into a closed loop. The pump 140 may then be initiated to evacuate any fluidic contents, for example air, that may be within the closed loop to create a vacuum of the desired pressure. Treatment agent, the flow thereof being indicated by arrows 500 in FIG. 5, which in an example is a solvent chosen to be a solvent for the 3D-printed plastic part 400, is then introduced to the pump 140 through the inlet 440. The heater 430 then heats the interior 120 of the treatment chamber 110 to the desired temperature. In the example of a solvent, the temperature and pressure may be suitable to vaporise the solvent. The pump 140 is then initiated to circulate the vaporised solvent 500 around the closed loop. Vaporised solvent 500 is pumped from the pump 140 at the two outlets 190*a*, 190*b* of the pump 140 through the tubes 170, and to the two inlets 150*a*, 150*b* at the top and bottom surface of the treatment chamber 110. The vaporised solvent then enters the interior 120 of the treatment chamber 110 through the apertures 220 of the gas diffusion plates 200. The passage of the vaporised solvent 500 through the gas diffusion plates 200 causes the vaporised solvent to disperse evenly within the interior 120 of the treatment chamber 110 and contact the outer surface of the 3D-printed plastic part 400 evenly. The contact of the vaporised solvent 500 on the 3D-printed plastic part 400 partly dissolves the outer surface thereof, and polishes it.

Movement of the vaporised solvent 400 within the interior 120 causes rotation of the impeller 300, which further acts to disperse and homogenise the vaporised solvent 500.

The vaporised solvent 500 may also be drawn out of the interior 120 of the treatment chamber 110 through the outlet 160 back to the pump 140. It is the constant recirculation of the vaporised solvent around the closed loop and through the gas diffusion plates 200 and/or the impellers 300 that homogenises the vaporised solvent 500 and enables the even treatment of the 3D-printed part.

Once the 3D-printed part has been processed, the pump 140 (or, in an example, another pump 140) may then draw the treatment agent out of the treatment chamber 110. The used treatment agent may then be collected for recycling or disposal.

Figure 6:
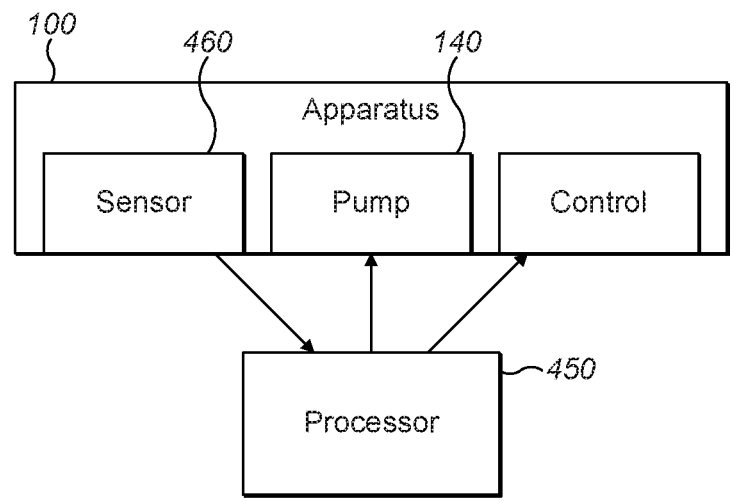
FIG. 6 is a flow diagram of an example of a system.
Figure 7:
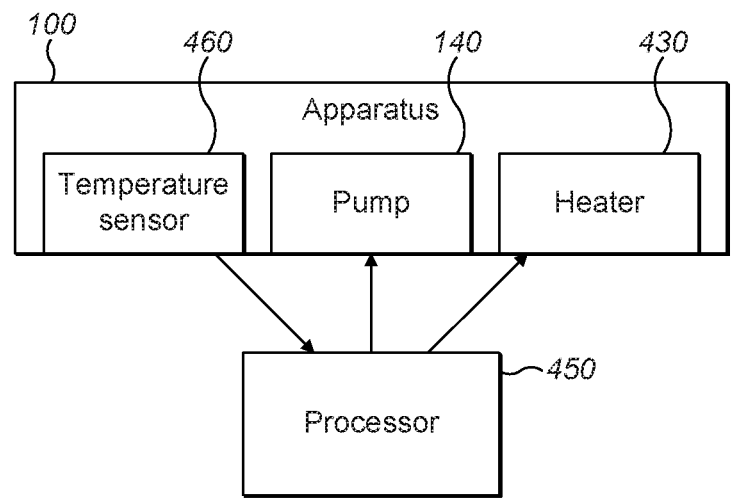
FIG. 7 is a flow diagram of an example of a system.

In an example, a system may be provided, which for example may include treatment apparatus 100 as previously described and shown, such as in FIG. 2. The system, as also shown in FIGS. 6 and 7, comprises a pump 140, a sensor 460 to detect a condition in the treatment chamber, and a processor 450 to control the operation of the apparatus 100. The processor 450 may be arranged to receive input from the sensor 460 and control the condition within the treatment chamber 110 to a desired level, and control the pump 140 to circulate the treatment agent around the closed loop.

A plurality of sensors 460 may be provided, which detect a range of different conditions such as temperature and pressure.

Referring to FIG. 7, the sensor 460, for example, could be disposed to detect the temperature within the treatment chamber 110. The sensor 460 may feed the temperature back to the processor 450, which could act to regulate the temperature. For example, the system could comprise a heater 430 and the processor 450 could act to control the heater 430 to regulate the temperature. Alternatively, the system could comprise a thermostat to control the temperature within the treatment chamber 110. In examples where the article to be treated is a 3D-printed plastic part, and/or the treatment agent is a solvent, the temperature of the solvent could be held at the dew point, so that the solvent is vaporised in the treatment chamber 110 and condenses on the 3D printed part in order to treat it.

The sensor may also detect pressure. In some examples, including examples where the article to be treated is a 3D-printed plastic piece and the treatment agent is a solvent, the treatment chamber 110 may be kept at a negative pressure in order to vaporise the solvent. A pressure sensor will be able to detect a change in pressure. The sensor may feed the change in pressure to the processor, which may act to control the pressure.

The processor 450 may also initiate the pump 140 to circulate the treatment agent. Further the processor 450 may be programmed to cease the pump 140 when a predetermined treatment time has been reached.

Figure 8:
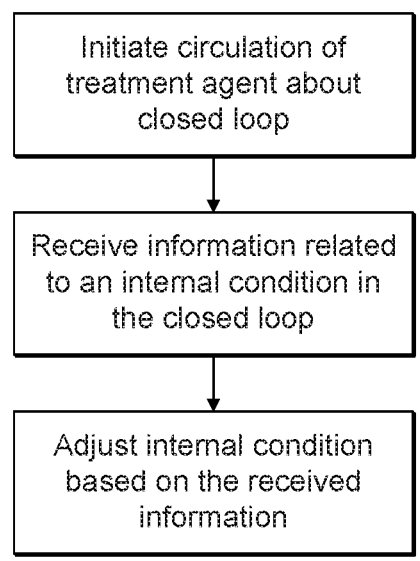
FIG. 8 is block diagram of example instructions executable by a processor.

There may also be provided a non-transitory machine-readable storage medium which may be encoded with instructions executable by a processor 450. As shown in FIG. 8 the machine-readable storage medium comprises: instructions to initiate circulation of a treatment agent about a closed loop, the closed loop comprising a pump 140, a treatment chamber 110 having an interior 120 in fluidic communication with the pump 140, and at least one disperser 130 wholly disposed within the closed loop; receive information related to an internal condition in the closed loop; and adjust the internal condition based on the received information. The information may be temperature. The machine readable storage may be any electronic, magnetic, optical or other physical storage device that stores executable instructions. Thus, machine-readable storage medium may be, for example, Random Access Memory (RAM), an Electrically-Erasable Programmable Read-Only Memory (EEPROM), a storage drive, and optical disc, and the like.

The invention claimed is:

1. An apparatus comprising:
   a hermetically sealable treatment chamber into which an article to be treated is to be disposed;
   a pump in fluidic communication with the treatment chamber to form a closed loop, the pump arranged to circulate a treatment agent about the closed loop; and
   a disperser disposed within the treatment chamber and arranged to disperse the treatment agent into the treatment chamber as the treatment agent is circulated about the closed loop by the pump and enters the treatment chamber at first and second inlets thereof,
   wherein the disperser comprises:
      a first gas diffusion plate at the first inlet; and
      a second gas diffusion plate at the second inlet.

2. The apparatus in accordance with claim 1, wherein the disperser is a first disperser, the apparatus further comprising:
   a second disperser disposed within the treatment chamber, the second disperser arranged to dispose the treatment agent within the treatment chamber as the treatment chamber is circulated about the closed loop by the pump.

3. The apparatus in accordance with claim 2, wherein the second disperser comprises an impeller.

4. The apparatus in accordance with claim 1, wherein the pump is a vacuum pump.

5. The apparatus in accordance with claim 1, further comprising either or both of:
   a sealable opening in the treatment chamber for inserting the article to be treated into the treatment chamber; and
   a heater arranged to heat the treatment agent.

6. The apparatus in accordance with claim 1, wherein the pump is a first pump, the apparatus further comprising:
   a second loop separate to the closed loop, the second loop comprising a second pump arranged to extract the treatment agent from the treatment chamber.

7. The apparatus in accordance with claim 1, further comprising a processor to control the pump.

8. A system comprising:
   a pump;
   a hermetically sealable treatment chamber in fluidic communication with the pump to form a closed loop about which the pump is arranged to circulate a treatment agent;
   a disperser disposed within the treatment chamber and arranged to disperse the treatment agent into the treatment chamber as the treatment agent is circulated about the closed loop by the pump and enters the treatment chamber at first and second inlets thereof, in order to ensure coverage of the treatment agent on an article to be treated;
   a sensor to detect a condition in the closed loop; and
   a processor to:
      receive input from the sensor and control the condition within the closed loop; and
      control the pump to circulate the treatment agent around the closed loop, wherein the disperser comprises:
         a first gas diffusion plate at the first inlet; and
         a second gas diffusion plate at the second inlet.

9. The system in accordance with claim 8, further comprising a heater arranged to heat the treatment agent.

10. The system in accordance with claim 9, wherein the sensor comprises a temperature sensor, and the processor controls temperature by operating the heater.

11. A non-transitory machine-readable storage medium storing instructions executable by a processor to:
   initiate circulation of a treatment agent about a closed loop comprising:
      a treatment chamber;
      a pump in fluidic communication with the treatment chamber and arranged to circulate the treatment agent about the closed loop; and
      a disperser disposed within the treatment chamber and arranged to disperse the treatment agent into the treatment chamber as the treatment agent is circulated about the closed loop by the pump and enters the treatment chamber at first and second inlets thereof;
   receive information related to an internal condition in the closed loop; and
   adjust the internal condition based on the received information,
   wherein the disperser comprises:
      a first gas diffusion plate at the first inlet; and
      a second gas diffusion plate at the second inlet.

12. The non-transitory machine-readable storage in accordance with claim 11, wherein the information is temperature.

* * * * *